United States Patent Office 3,450,791
Patented June 17, 1969

3,450,791
MODIFIED POLYURETHANE-SILICONE
POLYMERS
Kazys Sekmakas, Chicago, and Joseph E. Gaske, Bridgeview, Ill., assignors to De Soto, Inc., Chicago, Ill., a corporation of Delaware
No Drawing. Filed Sept. 29, 1966, Ser. No. 583,092
Int. Cl. C08g 31/12, 47/10
U.S. Cl. 260—826                                        23 Claims

ABSTRACT OF THE DISCLOSURE

Heat-hardening resins are provided by condensing a hydrocarbon-substituted polysiloxane with an hydroxy-functional polyurethane produced by reacting an excess of hydroxy-functional polyester which is preferably oil-free and unsaturated with 1–20% by weight of aliphatic diisocyanate. These resins are solvent-soluble and cure rapidly to provide weather resistant coatings. A small proportion of lipophilic monomer is preferably copolymerized into the product to improve the capacity of the coating solution to flow and wet the substrate which is coated.

---

The present invention relates to organic solvent-soluble, heat-hardening, non-gelled resins produced from hydroxy-functional polyurethane resins and silicone resins, the polyurethane being preferably based upon unsaturated polyester resins with a small proportion of lipoprilic monomer being used to further enhance properties.

The new resins of the invention are particularly useful in organic solvent solution coating compositions which cure at elevated temperature to provide thermoset coatings having greatly enhanced resistance to long term exterior exposure.

In general, organo-silicone resinous materials of many types are known, but these are generally slow curing and cured films produced from the same lack desirable physical characteristics, especially from the standpoint of film flexibility, toughness and impact resistance. It is espescially desirable to incorporate large proportions of the silicone resin into the organic resin including the same, the degree of durability achieved being generally proportional to the amount of silicone resin which is incorporated. Unfortunately, as the proportion of silicone resin is increased, the curing rate of the organic polymer becomes less satisfactory and the films tend to be brittle and therefore of only limited utility.

When polyester resins are combined with silicone resins, the composite resin tends to exhibit poor plate wetting properties, cratering tendencies are observed and the flow characteristics are poor. Incerasing the molecular weight of the polyester is not generally satisfactory since, unless one proceeds as taught herein, there is a tendency to introduce brittleness and there is also a danger of gelation as well as a tendency toward discoloration. The problem of the invention is, therefore, to increase the molecular weight of the polyester used in order to minimize the flow and wetting difficulties and to do this without significantly antagonizing the gelation problem or causing the production of excessively discolored polymers, or introducing undesirable brittleness into the polymer.

In accordance with the present invention, an hydroxy-functional polyester resin is reacted with a small proportion of aliphatic diisocyanate in order to form a high molecular weight, hydroxy-terminated polyurethane, which is then condensed with a polyalkoxy siloxane in order to provide the rapid curing organo-silicone resinous materials which are desirable in accordance with the invention, these being organic solvent-soluble and non-gelled. The aliphatic diisocyanate does not contribute color problems and it does improve the flow and wetting properties of the resin which is produced though these properties can be further increased as discussed more fully hereinafter. The utilization of diisocyanate to increase the molecular weight of the polyester does not significantly increase the danger of gelation when the product of increased molecular weight produced thereby is condensed with polyalkoxy siloxane or otherwise modified in accordance with the invention. The use of aliphatic diisocyanates is essential to the achievement of good exterior exposure properties since the aromatic diisocyanates do not provide the same good color retention, durability and chalk resistance.

In the practice of the invention, the polyester resin which is used is produced by the polyesterification of components which contain at least 1.5 equivalents of hydroxy functionality per equivalent of carboxy functionality and, preferably, at least 50% of the hydroxy-functional components contains at least three hydroxy groups per molecule. Moreover, and as a feature of the invention, wetting and flow are further enhanced by the use of an unsaturated polyester which is modified by copolymerization with a small proportion of lipophilic monomer.

Referring more particularly to the polyesters which may be used in accordance with the invention, these, as is well known, are produced by the polyesterification of polyhydric alcohols with polycarboxylic acids. The invention requires the utilization of a polyester having a considerable hydrovy functionality as is provided by the polyesterification of components which contain at least 1.5 equivalents of hydroxy functionality per equivalent or carboxy functionality. Preferably, the ratio of hydroxy to carboxy is at least 2.0:1 and, to emphasize the branched nature of the polyester, at least 50% of the least three hydroxy groups per molecule, these being illustrated by glycerine, trimethylol propane, pentaerythritol, and the like. Glycols such as ethylene glycol, propylene glycol, butylene glycol, diethylene glycol, and the like, may be present. Dicarboxylic acids such as any of the phthalic acids or the anhydride of orthophthalic acid are normally used to form the polyester, but aliphatic acids such as adipic acid and succinic acid are also useful as are unsaturated acids such as maleic acid and fumaric acid. Tri-basic acids such as trimellitic anhydride and tetrabasic acids such as mellitic dianhydride may be used, but are preferably absent or their proportion minimized to minimize the tendency toward gelation.

While the polyester may include an oil component the polyesters of the invention are preferably oil-free.

While the unsaturated polyester resins which are used in the invention are hydroxy-functional resins, this does not preclude the presence of some small residual acid functionality.

Any aliphatic diisocyanate may be used in the practice of this invention. Preferably the aliphatic portion of the compound is a divalent hydrocarbon radical containing at least 6 carbon atoms, preferably more than 10 carbon atoms. The hydrocarbon group may be straight branched or cyclic since all of these are useful in the practice of the invention. As has been indicated, aromatic diisocyanates are not equivalent to the aliphatic diisocyanates which are essential to the invention. Only diisocyanates can be used since higher functional compounds lead to gelation.

Examples of aliphatic diisocyanates which may be used include dicyclohexane-4,4'-diisocyanate, tetramethylene diisocyanate, hexamethylene diisocyanate, and the like. Especially desirable is 4,4' methylenebis (cyclohexyl isocyanate) which is a cycloaliphatic compound. Also useful are the diisocyanates based on fatty acid dimers such as that produced by dimerizing a C-18 fatty acid to obtain an aliphatic diisocyanate based on a 36 carbon divalent hydrocarbon radical.

The proportion of aliphatic diisocyanate is important. While the invention broadly contemplates the use of up to 20% by weight, based on the weight of the polyester, it is preferred that a smaller proportion is used, the preferred proportions on the same basis ranging from 1–10% by weight. Most preferably, from 2–6% of diisocyanate is used, especially when lipophilic monomer is also used as explained hereinafter.

It is stressed that while small proportions of diisocyanate are contemplated and preferred that these exhibit a profound effect on the resin which is produced. Thus, the incorporation of 2–3% of aliphatic diisocyanate into the polyester results in a 2–3 fold increase in viscosity and converts a product having little value because of poor wetting and flow characteristics into one which can be handled or better handled when lipophilic monomer is also used.

As will be appreciated, the isocyanate groups react vigorously with the excess of hydroxy groups present and are substantially completely consumed so that the final product is stable and is essentially devoid of isocyanate functionality.

In contrast, other chain lengthening agents would be needed in much larger proportion to provide a corresponding effect and the reaction in many cases would involve condensation and not addition. Most agents, such as the phthalic acids, lead to brittleness. Unsaturated diacids such as maleic tend strongly toward gelation. Epoxy compounds tend to chalk. Amines tend to introduce considerable discoloration. The use of small amounts of aliphatic diisocyanates is critical.

The preferred polyesters are unsaturated in a manner which permits copolymerization with lipophilic monomers without gelation, it being understood that these polyesters are polyethylenically unsaturated and not monoethylenically unsaturated.

The unsaturation can be introduced into the polyester by the polyesterification of an unsaturated polycarboxylic acid such as maleic acid, fumaric acid, itaconic acid, aconitic acid, glutaconic acid or citraconic acid or by the polyesterification of an unsaturated polyhydric alcohol such as 2-butene-1,4-diol, this providing highly reactive unsaturation in the linear backbone of the polyester.

On the other hand, unsaturation can be introduced into the unsaturated polyester resin through the presence of unsaturated side chains as by the use of unsaturated monofunctional components such as unsaturated monohydric alcohols or unsaturated monocarboxylic acids. Thus, a proportion of unsaturated monohydric alcohol may be used, such as allyl alcohol, methallyl alcohol or crotyl alcohol. Unsaturated monocarboxylic acids are illustrated by crotonic acid and by fatty acids containing conjugated unsaturation such as eleostearic acid, licanic acid, or dehydrated castor oil fatty acids, this conjugated unsaturation providing reactive double bonds to enable copolymerization. Incorporation of monocarboxylic acids is facilitated by the use of glycerine in the production of the polyester. When the glycerine polyester is preformed, the monoacid reacts with the secondary hydroxyl group of the glycerine residue but, as is known, the polybasic acid, the glycerine, and the monoacid may all be polyesterified together in a single reaction. Since the polyester used need not be of high molecular weight, the monofunctional acid or alcohol may function as a chain terminating agent. Other monofunctional agents are also unable to introduce unsaturation for copolymerization such as allyl glycidyl ether. In other words, the unsaturation in the polyester required for copolymerization is preferably selected from the group consisting of: (1) alpha, beta-unsaturation; (2) beta, gamma-unsaturation; or (3) conjugated unsaturation.

Broadly, the unsaturated polyester resin should contain about 0.005 to 0.40 gram mol of ethylenically unsaturated component per 100 grams of polyester. Of course, the precise preferred proportion of unsaturation will vary depending no the reactivity of the unsaturated component (maleic acid is more reactive than crotonic acid). Moreover, practical aspects of processing must be kept in mind since, with less unsaturation, one may copolymerize for longer periods of time and/or more vigorous conditions. With more unsaturation, there is a tendency to gel, especially with more reactive materials such as maleic anhydride or acid. However, one can terminate the reaction before gelation, especially when the reaction is carefully supervised, or the reaction may be effected under very mild conditions. Preferably, and when using polyester containing unsaturation in the backbone of the polyester as by using maleic acid, the polyester resin desirably contains 0.01–0.1 gram mol of unsaturated component per 100 grams of polyester. With less reactive polyesters such as those containing the unsaturation in a side chain as by the use of crotonic acid or allyl alcohol, the polyester resin desirably contains from 0.02–0.3 gram mol of unsaturated component per 100 grams of polyester.

While the molecular weight of the unsaturated polyester is of secondary significance so long as the polyester is not gelled, it is desirable to employ polyesters which have a viscosity in n-butanol at 80% solids in the range of from C to Z–6, preferably in the range of from V to Z–2 measured on the Gardner-Holdt scale at 25° C.

The unsaturated polyester and lipophilic monomer are desirably prereacted, before etherification with the siloxane resin, in the presence of an appropriate polymerization catalyst. Any free-radical generating polymerization catalyst may be used and the copolymerization should be carried out in organic solvent solution in accordance with the invention. The selection of catalyst is determined by the desired temperature for the polymerization reaction. The important point is that the agent liberate free radicals under the conditions of polymerization so that the addition polymerization is facilitated. The class of free-radical generating polymerization catalysts is too well known to require elucidation except to point out that typical catalysts are illustrated in the examples.

Normally, the reaction between a vinyl monomer and an unsaturated polyester resin is a cross-linking reaction which thermosets the polyester, but this is not the desired result in the practice of this invention. The small proportion of vinyl monomer with its long hydrocarbon chain that is used herein does not tend to thermoset the polyester resin but merely modifies its characteristics to provide the wetting and flow characteristics which are desired.

The lipophilic monomers which may be used in the invention may be constituted by any monoethylenically unsaturated monomer having a lipophilic terminal group, e.g., a hydrocarbon chain containing at least 4 carbon atoms. In addition to stearyl and lauryl acrylate, one can use the corresponding methacrylate. Butyl methacrylate is useful even though it is of minimal chain length and is a desirable agent to select because of its lower cost, but 2-ethylhexyl acrylate is viewed as superior, and it is also of modest cost and readily available. Dibutyl maleate or fumarate may also be used, but monomers containing the $CH_2=C<$ group are preferred. As can be seen, alcohol esters of monoethylenic monocarboxylic acids are preferred, especially acrylic acid, methacrylic acid and crotonic acid. Alcohols containing at least 6 carbon atoms are preferred.

The proportion of lipophilic monomer of the invention should range from 1–10%, based on the total weight of the final completed resin, including both the hydroxy-functional polyester component and the siloxane component. Preferred proportions on the same basis are from 2–10%, most preferably from 3–8%. The purpose is to further enhance the wetting, non-cratering and flow characteristics in order to provide a superior system.

The presence of the polyalkoxy siloxane resin in accordance with the invention is beneficial within a very large range of proportions. Broadly, the siloxane is incorporated in an amount of from 15–50% by weight, based on the total weight of the final resin. Preferably, proportions are from 20–45% on the same basis, typical products being illustrated by 30%. The maintenance of compatibility, rapid cure and the achievement of films possessing good properties as the proportion of silicone resin increases above 20% represents a surprising and most valuable discovery.

It is to be observed that the proportions used are based upon the entire siloxane resin prior to etherification. This is because the silicon-oxygen bond as well as the silicon-hydrocarbon bond is very resistant to degradation so that from 80–90% of the soloxane compound used may be viewed as accounting for the improved durability which is achieved.

The ratio of polymethoxy siloxane to modified unsaturated polyester can vary considerably and can be expressed on an equivalent basis comparing methoxy functionality in the siloxane with hydroxy functionality in the modified polyester. On this basis, the ratio may vary from 1:1.5 to 1:5, preferably from 1:1.8 to 1:4. Most preferably, hydroxy functionality is in substantial excess of at least 2:1.

The extent of reaction can also vary widely, e.g., at least 10%, based on methoxy, but preferably higher so long as gelation is avoided. In the preferred situation, the methoxy group is reacted to an extent of from 25% to 90%, the hydroxy being in substantial excess as has been stated.

Completion of the siloxane etherification to the extent desired can be accurately determined by the elimination of methanol given off during the reaction. The etherification reaction is generally carried out at a temperature ranging from 200–350° F. The reaction may be carried out under a reduced pressure in order to speed the removal of the volatile product of the etherification, but this is not essential.

It is to be noted that excessive etherification leads to gelation. In the most aggravated situation, gelation takes place at the elevated etherification temperature. In less severe situations, gelation or partial gelation occurs when the product is cooled. This is a typical situation in the production of any resin which is desirably advanced as far as possible without causing the product to gel, and experience should be used to gauge the maximum extent to which the etherification can be advanced without causing gelation.

It is desired to stress that the presence of the alkoxy group is important to the achievement of satisfactory resins in the absence of gelation. When the alkoxy group is presented as required by the invention, the condensation reaction leads to the release of alcohol which can be effected at a low temperature enabling the resin to be advanced to a point from which it can be cured rapidly and without causing the advancing resin to lose solvent solubility as it is prepared, which would be evidenced by gelation or by the production of insoluble resin particles which would have to be removed as by filtration.

It is to be noted that the methoxy group is referred to herein as a matter of convenience and this is the group which is preferably used. However, and within the broadest purview of the invention, any lower alkoxy group may be utilized, the term "lower" identifying the presence of from 1–4 carbon atoms.

Broadly, any polymethoxy silane may be used in accordance with the invention, these being of two types:

$$RSiX_3 \text{ or } R_2SiX_2$$

in which X identifies the alkoxy or more preferably the methoxy group. It is particularly preferred to employ polymethoxy siloxanes which have the structural unit:

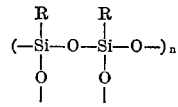

in which n denotes the average number of recurring groups in the resinous molecule.

The preferred hydrocarbon-substituted polysiloxanes are illustrated by dimethyl triphenyl trimethoxy trisiloxane or hydrolyzates of the same which contain from 5–20% by weight of the methoxy group. The base compound can be referred to as having the following average chemical formula:

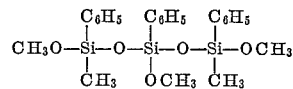

In practice, a compound of the above formula is available with an average molecular weight of 470, a combining weight of 155 and a methoxy content of 20% by weight. This product has a viscosity at 77° F. of 13 centistokes (A–3 on the Gardner-Holdt scale).

Another appropriate product is obtained by hydrolysing the above-described trisiloxane to reduce its methoxy content to 15% by weight, which increases its molecular weight until the viscosity at 77° F. is from 60–120 centistokes (B to E on the Gardner-Holdt scale). This product is referred to in the Examples which follow as Siloxane Resin "A."

The amount of water used in the hydrolysis can be varied to adjust the final methoxy content and appropriate products can be formulated to include a final methoxy content of from 10–20% by weight, corresponding to a molecular weight of from 470 to somewhat over 2,000.

Especially preferred is a compound having the formula:

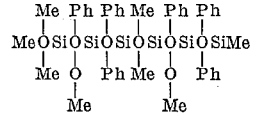

in which Ph identifies the phenyl group and Me the methyl group. This structure contains a plurality of methoxy groups per molecule and has a weight percent methoxy of 13.9%.

In the invention, the silicon-containing component is incorporated by a reaction between hydroxy groups and methoxy groups which splits off methanol under conditions in which methoxy groups are not able to react with themselves, so that polymerization of the silicon-containing component by condensation is avoided to a greater extent than would be the case if the silicon-containing component were combined into the unsaturated polyester resin by condensation of hydroxy groups. As a result, a greater proportion of silicon-containing component can be incorporated without difficulty in the present invention.

It is first desired to point out that the curing reaction is between the silicon-carried methoxy groups and hydroxy or methylol groups carried elsewhere in the interpolymer. Such reactions are much faster than the self-condensation of methoxy groups which is the mechanism through which the methoxy siloxane cures in the absence of the present invention. For this reason, the products of the invention cure at much lower temperatures to provide a highly cross-linked, three-dimensional structure.

While the siloxane-containing interpolymers are importantly useful alone in organic solvent solution coating compositions, they also exhibit excellent compatibility with other film-forming resinous materials, and are desirably applied in admixture therewith. The term "admixture" includes partial pre-reaction between the respective components which are blended together. In this regard, excellent compatibility is exhibited with heat-hardening, solvent-soluble polymethylol compounds including urea-formaldehyde condensates and melamine-formaldehyde condensates as well as aldehyde condensates with other triazines, such as benzoguanamine, all of the foregoing falling generally within the heading of aminoplast resins which function to enhance curing capacity when the interpolymers of the invention are deficient in this respect. The aminoplast resin is utilized in an amount of from 5–50% by weight, based on the total weight of resin. Excellent compatibility is also exhibited with alkyd, epoxy, and vinyl resins.

It will be understood that the invention is illustrated, but not limited by the specific examples presented hereinafter. It will also be evident that the products of the invention, while useful in diverse types of heat-hardening resinous compositions are primarily useful in the coating art, in which event they are applied either alone or in combination with other resins, from a compatible organic solvent solution. These coating solutions may be pigmented or contain dyes, flow control agents, waxes and various other components as will be evident to those skilled in the art.

EXAMPLE I

Preparation of hydroxy-terminated unsaturated polyester

| | Parts by weight |
|---|---|
| Trimethylol propane | 2700 |
| Isophthalic acid | 940 |
| Xylol | 30 |
| 2-ethoxy ethanol acetate | 30 |

Charge in reactor equipped with agitator, thermometer, Stark & Dean trap, nitrogen inlet tube, and a reflux condenser. Heat to 430° F. and hold for an acid value of 65–75.

| | Parts by weight |
|---|---|
| Adipic acid | 730 |
| Isophthalic Acid | 600 |
| Maleic anhydride | 60 |
| 2-ethoxy ethanol acetate | 20 |

Reheat to 420° F. and hold for an acid value of 10–12.

| | Parts by weight |
|---|---|
| 2-ethoxy ethanol acetate | 2700 |

Add to 60% solids.

Final Characteristics
- Viscosity (Gardner) _____ U–V.
- Viscosity _____ 8.0 poises.
- Hydroxyl value _____ 38.1.
- Hydroxyl equivalence _____ .68 per 100 grams of resins solids.

In the above polyester, the components are chosen to provide a ratio of hydroxy functionality to carboxy functionality of 2.1:1.0. The degree of unsaturation, which is provided by highly reactive maleic anhydride, is .012 moles per 100 grams of resins solids.

EXAMPLE II

Preparation of polyurethane resin

| | Composition, percent |
|---|---|
| Hydroxy terminated unsaturated polyester resin of Example I | 91.3 |
| Aliphatic diisocyanate | 8.7 |

Procedure of preparation

| | Parts by weight |
|---|---|
| Polyester of Example I (60% solids) | 1800 |

Set Stark & Dean trap and using nitrogen sparge, distill off free water (3 ml.). Remove trap and cool to 175° F.

| | Parts by weight |
|---|---|
| Dicyclohexylmethane 4,4′-diisocyanate | 102 |
| 2-ethoxyethanol acetate | 63 |

Premix diisocyanate with 2-ethoxy ethanol acetate and add to reactor from separatory funel in 50–55 ml. increments every 40 minutes. Add catalyst.

| | Parts by weight |
|---|---|
| Dibutyl tin dilaurate | .5 |

Heat to 190–195° F. and hold for a viscosity of Z–1 to Z–2 (30 poises). When viscosity is reached, add:

| | Parts by weight |
|---|---|
| 2-ethoxy ethanol acetate | 345 |

Dilute to R–T viscosity.

Note.—Viscosities reported on the Gardner-Holdt scale.

Final Characteristics
- Solids, percent _____ 50.6
- Viscosity _____ R–T

EXAMPLE III

Preparation of polyurethane-siloxane resin

| | Composition, percent |
|---|---|
| Siloxane resin "A" (15% methoxy) | 30 |
| Polyurethane resin of Example II (50.6% solids) | 70 |

Procedure of preparation

| | Parts by weight |
|---|---|
| Polyurethane resin of Example II | 2310 |
| Siloxane resin "A" (15% methoxy), 2.47 equivalents | 506 |
| Tetrabutyl titanate | 1.6 |
| 2-ethoxyethanol acetate | 396 |

Premix and add to the flask containing polyurethane. Set Dean-Stark trap and distill off methanol at 240–260° F. Collect 49.4 grams methanol. Add butanol.

| | Parts by weight |
|---|---|
| Butanol | 55 |

Add to adjust viscosity.

Final Characteristics
- Degree of condensation, percent _____ 76
- Solids, percent _____ 52.1
- Viscosity _____ W–X
- Color (Gardner) _____ 3–4
- Weight per gallon _____ 9.2

EXAMPLE IV

Preparation of lipophilic monomer-modified polyester resin

| | Composition, percent |
|---|---|
| Polyester resin of Example I | 93.4 |
| 2-ethylhexyl acrylate | 6.6 |

Procedure of preparation

| | Parts by weight |
|---|---|
| 2-ethylhexyl acrylate | 50 |
| 2-ethoxyethanol acetate | 370 |

Charge into a reactor equipped with an agitator, thermometer, nitrogen inlet tube and reflux condenser. Heat to 240° F.

| | Parts by weight |
|---|---|
| Hydroxy-terminated unsaturated polyester of Example I (60% solids) | 1167 |
| Cumene-hydro-peroxide | 15 |

Premix and add over 2 hour period at 240° F. Hold for 2 hours at 240–250° C.

Final Characteristics
- Solids _____ Percent 50.5

EXAMPLE V

Preparation of lipophilic monomer-modified polyurethane resin

| | Composition, percent |
|---|---|
| Lipophilic monomer-modified polyester resin of Example IV | 96 |
| Diisocyanate | 4 |

Procedure of preparation

| | Parts by weight |
|---|---|
| Lipophilic monomer-modified polyester resin of Example IV (50.5% solids) | 1587 |

Set Dean-Stark trap and using nitrogen sparge distill off free water (3 ml.). Remove trap and cool to 175° F.

| | Parts by weight |
|---|---|
| Dicyclohexylmethane 4,4'-diisocyanate | 33.39 |
| 2-ethoxyethanol acetate | 63 |

Premix diisocyanate with 2-ethoxyethanol acetate and add to reactor from separatory funel in 50–55 ml. increments every 40 minutes.

| | Parts by weight |
|---|---|
| Dibutyl tin dilaurate | 0.5 |

Add and heat to 190–195° F. Hold for a viscosity of Z–1 to Z–2 (30 poises). When viscosity is reached, add:

| | Parts by weight |
|---|---|
| 2-ethoxyethanol acetate | 345 |

Dilute to desired viscosity.

Final Characteristics

| | Percent |
|---|---|
| Solids | 46.2 |

EXAMPLE VI

Preparation of lipophilic monomer-modified polyurethane resin-siloxane resin

| | Composition, percent |
|---|---|
| Siloxane resin "A" (15% methoxy) | 30 |
| Modified polyurethane resin of Example V | 70 |

Procedure of preparation

| | Parts by weight |
|---|---|
| Polyurethane resin of Example V (46.2% solids) | 2028.4 |
| Siloxane resin "A" (15% methoxy) | 401 |
| Tetrabutyl titanate | 1.6 |
| 2-ethoxyethanol acetate | 396 |

Premix and add to the flask. Set Stark & Dean trap and distill off methanol at 240–260° F. Collect 49.4 grams methanol. Add butanol.

| | Parts by weight |
|---|---|
| Butanol | 55 |

Add to adjust viscosity.

Final Characteristics

| | Percent |
|---|---|
| Degree of condensation | 76 |
| Solids | 48.4 |

EXAMPLE VII

Preparation of hydroxy terminated unsaturated polyester:

| | Parts by weight |
|---|---|
| Trimethylol propane | 2700 |
| Xylol | 30 |
| 2-ethoxyethanol acetate | 30 |
| Adipic acid | 730 |

Charge into reactor equipped with agitator, thermometer, Stark & Dean trap, nitrogen inlet tube and a reflux condenser. Heat to 250° F. to melt. When material is melted, add:

| | Parts by weight |
|---|---|
| Isophthalic acid | 1710 |
| Maleic anhydride | 60 |
| Xylol | 20 |
| 2-ethoxyethanol acetate | 20 |

Reheat to 420° F. and hold for an acid value of 10.

| | Parts by weight |
|---|---|
| 2-ethoxyethanol acetate | 2800 |

Add to 60% solids.

Final characteristics:

| | |
|---|---|
| Viscosity (Gardner-Holdt) | V–W |
| Solids, percent | 59.3 |
| Acid value | 9.8 |
| Color (Gardner) | 1 |

EXAMPLE VIII

Modification of polyester with lipophilic monomer and preparation of urethane-siloxane polymer therefrom

| | Composition, percent |
|---|---|
| Unsaturated urethane resin | 69 |
| 2-ethyl hexyl acrylate | 3 |
| Siloxane resin "A" | 28 |

Procedure of preparation

| | Parts by weight |
|---|---|
| Unsaturated polyester of Example VIII | 1497 |
| 2-ethyl hexyl acrylate | 4 |
| Cumene hydro peroxide | 4 |

Charge into reactor. Heat to 240° F.

| | Parts by weight |
|---|---|
| 2-ethyl hexyl acrylate | 36 |
| Cumene hydro peroxide | 14 |

Premix. Add to reactor over 20 minutes. Hold for 1½ hours at 240–250° F. Cool to 180° F.

| | Parts by weight |
|---|---|
| 2-ethoxyethanol acetate (urethane grade) | 25 |
| Dicyclohexylmethane 4,4'-diisocyanate | 27 |

Premix diisocyanate with 2-ethoxyethanol acetate and add to reactor over 10 minutes. Hold for one hour at 180–185° F.

| | Parts by weight |
|---|---|
| Siloxane resin "A" | 371 |
| Tetrabutyl titanate | 0.9 |
| 2-ethoxyethanol acetate | 440 |
| Butanol | 100 |

Premix and add to the flask. Set Stark & Dean trap and distill off methanol at 255–265° F. Collect 38 grams of methanol. Viscosity Y-Z. Cool to 190° F. and add butanol.

Final characteristics:

| | |
|---|---|
| Viscosity (Gardner-Holdt) | X |
| Solids, percent | 51.9 |
| Color (Gardner) | 2 |

A high gloss enamel containing the interpolymer of Example VIII is prepared using the following composition:

| | Percent |
|---|---|
| Titanium dioxide | 28 |
| Nonvolatile resin of Example VIII | 32 |

The enamel is drawn down on a chromate-treated aluminum panel with #38 wound wire rod and baked for 90 seconds at 475° F.

The following results are obtained:

| | |
|---|---|
| Gloss (photovolt 60° reading) | 89. |
| Mar resistance | Very good. |
| Flow | Very good. |
| Pencil hardness | H. |
| Reverse impact | Pass 35 in./lb. |
| Acetone resistance | Passed 50 rubs. |
| Adhesion to metal | Excellent. |

As the above results demonstrate, the coatings prepared with the urethane-siloxane polymer exhibit good flexibility, impact, adhesion and curing properties. The enamel is applied to an aluminum panel that had been streaked with marking ink and a thin film of lanolin. The siloxane-urethane resin modified with lipophilic monomer exhibited excellent flow and outstanding wetting properties over greasy surfaces.

EXAMPLE IX

Example VIII was repeated with the exception that the lipophilic monomer (2-ethyl hexyl acrylate) was not employed. The resin solution so produced is then compared with the resin solution produced in Example VIII by applying each of these solutions over aluminum panels streaked with a thin film of lanolin and marking ink. The coating solutions are baked for 90 seconds at 475° F. to cure the same.

The resin of Example VIII which is modified with 3% of lipophilic monomer exhibits outstandingly superior flow, wet inking and coverage of greasy or oily metal surfaces. This is extremely important in coil coating plants, where lubricating greases and oil may contaminate metal surfaces. The resin modified with lipophilic monomer also has better pigment wetting properties.

The resin of Example IX which is similar to the resin of Example VIII, except that 3% of lipophilic monomer was not included, also forms a hard flexible film, but exhibits cratering tendencies and shows less favorable wetting properties over grease, lanolin, marking ink and crayon. The resin containing no lipophilic monomer also tends to flocculate pigments, which creates problems on production lines since color is difficult to match.

EXAMPLE X

Example VIII is repeated except the dicyclohexylmethane 4,4'-diisocyanate is replaced with a diisocyanate having the structure:

$$O=C=N[D]N=C=O$$

where D is a 36 carbon atom hydrocarbon radical derived from dimeric C-18 fatty acid.

The siloxane-urethane resin of Example exhibits excellent performance characteristics which are comparable to the resin of Example VIII.

We claim:
1. Organic solvent-soluble, non-gelled, heat-hardenable organo-silicone resinous material produced by condensing:
   (a) hydrocarbon-substituted polysiloxane having a plurality of silicon-bonded alkoxy groups in which the alkoxy groups contain from 1–4 carbon atoms; with
   (b) hydroxy-functional polyurethane which is the reaction product of an excess of oil-free hydroxy functional unsaturated polyester resin with from 1 to 20% by weight, based on the polyester, of aliphatic diisocyanate, said polyester resin being the polyesterification product of components which contain at least 1.5 equivalents of hydroxy functionality per equivalent of carboxy functionality, said polysiloxane and said polyurethane being combined in an equivalent ratio of alkoxy groups in said siloxane to hydroxy groups in said polyurethane of from 1:1.5 to 1:5 and reacted to consume from 10–90% of the alkoxy groups present in said siloxane.

2. Organo-silicone resinous material as recited in claim 1 in which the alkoxy group of said siloxane is a methoxy group.

3. Organo-silicone resinous material as recited in claim 1 in which the equivalent ratio of alkoxy groups in said component (a) to hydroxy groups in said component (b) is in the range of 1:1.8 to 1:4.

4. Organo-silicone resinous material as recited in claim 1 in which said siloxane is present in an amount of from 15–50% by weight, based on the total weight of the organo-silicone resinous material.

5. Organo-silicone resinous material as recited in claim 1 in which from 25–90% of the alkoxy content of said component (a) is consumed.

6. Organo-silicone resinous material as recited in claim 1 in which the equivalent ratio of alkoxy groups in said component (a) to hydroxy groups in said component (b) is at least 1:2 and said alkoxy group is the methoxy group.

7. Organo-silicone resinous material as recited in claim 1 in which said siloxane contains from 5–20% by weight of the methoxy group.

8. Organo-silicone resinous material as recited in claim 1 in which the unsaturation of said polyester is selected from the group consisting of (1) alpha,beta-unsaturation; (2) beta,gamma-unsaturation; and (3) conjugated unsaturation.

9. Organo-silicone resinous material as recited in claim 1 in which said unsaturated polyester resin contains about 0.005 to 0.40 gram mol of ethylenically unsaturated component per 100 grams of polyester.

10. Organo-silicone resinous material as recited in claim 1 in which said polyester resin has a viscosity in n-butanol at 80% solids in the range of from C–Z6 on the Gardner-Holdt scale at 25° C.

11. Organo-silicone resinous material as recited in claim 1 in which at least 50% of the hydroxy-functional material used in the preparation of said unsaturated polyester resin contains at least three hydroxy groups per molecule.

12. Organo-silicone resinous material as recited in claim 11 in which the polycarboxylic acid components of said polyester consist essentially of dicarboxylic acids.

13. Organo-silicone resinous material as recited in claim 1 in which the aliphatic diisocyanate is based on a divalent hydrocarbon radical containing at least 10 carbon atoms.

14. Organo-silicone resinous material as recited in claim 1 in which the aliphatic diisocyanate is utilized in an amount of from 2–6% based on the weight of the polyester.

15. Organic solvent-soluble, non-gelled, heat-hardenable organo-silicone resinous material produced by condensing:
   (a) hydrocarbon-substituted polysiloxane having a plurality of silicon-bonded alkoxy groups in which the alkoxy groups contain from 1–4 carbon atoms; with
   (b) hydroxy-functional polyurethane which is the reaction product of an excess of oil-free hydroxy functional unsaturated polyester resin with from 1 to 20% by weight, based on the polyester, of aliphatic diisocyanate, said polyester resin being the polyesterification product of components which contain at least 1.5 equivalents of hydroxy functionality per equivalent of carboxy functionality, the polyester portion of said polyurethane being modified by copolymerization with from 1–10% by weight, based on the total weight of the organo-silicone resinous material, of monoethylenically unsaturated monomer consisting essentially of lipophilic alkyl esters of mono- or dicarboxylic acids in which the alkyl group contains at least 4 carbon atoms, said polysiloxane and said polyurethane being combined in an equivalent ratio of alkoxy groups in said siloxane to hydroxy groups in said polyurethane of from 1:1.5 to 1:5 and reacted to consume from 10–90% of the alkoxy groups present in said siloxane.

16. Organo-silicone resinous material as recited in claim 15 in which the proportion of said monomer is in the range of from 3–8% by weight, based on the total weight of the organo-silicone resinous material.

17. Organo-silicone resinous material as recited in claim 16 in which said monomer is an alcohol ester of a monoethylenically unsaturated monocarboxylic acid.

18. Organo-silicone resinous material as recited in claim 17 in which said monocarboxylic acid is from the group of acrylic acid, methacrylic acid and crotonic acid.

19. Organo-silicone resinous material as recited in claim 18 in which said alcohol contains at least 6 carbon atoms.

20. An organic solvent solution thermosetting coating composition comprising organic solvent having dissolved therein the resin defined in claim 1.

21. Organic solvent-soluble, non-gelled heat-hardenable organo-silicone resinous material produced by condensing:
(a) polyalkoxy siloxane in which the substituents carried by the silicon atoms consist essentially of alkoxy, alkyl, and aryl radicals and in which there are a plurality of silicon-bonded alkoxy groups which contain from 1–4 carbon atoms; with
(b) hydroxy - functional, unsaturated polyurethane which is the reaction product of an excess of oil-free hydroxy functional unsaturated polyester resin with from 1–10%, based on the weight of the polyester, of aliphatic diisocyanate, said polyester resin being the polyesterification product of components which contain at least 1.5 equivalents per equivalent of carboxy functionality, with at least 50% of the hydroxy functional components containing at least three hydroxyl groups per molecule, said polyester containing about 0.005 to 0.40 gram mol of ethylenically unsaturated component per 100 grams of polyester and being modified by copolymerization with from 3–8% by weight, based on the total weight of the completed organo-silicone resinous material, of lipophilic monoethylenically unsaturated ester of monoethylenic monocarboxylic acid with alcohol containing a terminal hydrocarbon chain of at least 6 carbon atoms; said polyalkoxy siloxane and said polyurethane being combined in an equivalent ratio of alkoxy functionality in the siloxane to hydroxy functionality in the modified polyurethane of from 1:1.8 to 1:4, and said components (a) and (b) being reacted together to consume from 25–90% of the alkoxy groups in said siloxane.

22. Organo-silicone resinous materials as recited in claim 21 in which said siloxane is a polymethoxy siloxane containing from 5–20% by weight of the methoxy group and present in an amount of from 15–50% by weight, based on the total weight of the organo-silicone resinous material.

23. An organic solvent solution thermosetting coating composition comprising organic solvent having dissolved therein the resin defined in claim 1 in admixture with heat-hardening solvent-soluble aminoplast resin.

References Cited

UNITED STATES PATENTS

| | | | |
|---|---|---|---|
| 2,821,518 | 1/1958 | Edelman et al. | 260—824 |
| 2,879,248 | 3/1959 | Nischk et al. | 260—859 |
| 2,901,449 | 8/1959 | Schwarz et al. | 260—824 |
| 3,261,881 | 7/1966 | Christenson et al. | 260—826 |

OTHER REFERENCES

Weigel, German application 1,011,624, printed July 1957.

SAMUEL H. BLECH, *Primary Examiner.*

U.S. Cl. X.R.

117—132, 161; 260—22, 28.5, 31.4, 40, 75, 824, 827, 859, 872

PO-1050
(5/69)

UNITED STATES PATENT OFFICE
CERTIFICATE OF CORRECTION

Patent No. 3,450,791          Dated June 17, 1969

Inventor(s) Kazys Sekmakas and Joseph E. Gaske

It is certified that error appears in the above-identified patent and that said Letters Patent are hereby corrected as shown below:

Column 1, lines 30-31, "lipoprilic" should read --lipophilic--; Column 1, line 43, "espescially" should read --especially--; Column 1, line 54, "incerasing" should read --increasing--

Column 2, line 32, "hydrovy" should read --hydroxy--; Column 2, lines 37-38, "50% of the least three hydroxy groups per molecule, these being" should read --50% of the hydroxy-functional materials used should contain at least three hydroxy groups per molecule, these being--

Column 4, line 7, "no" should read --on--

Column 5, line 19, "soloxane" should read --siloxane--

Column 8, line 2, "funel" should read --funnel--; Column 8, line 71, "C." should read --F.--

Column 9, line 22, "funel" should read --funnel--

Column 11, line 53, "Example exhibits" should read --Example X exhibits--

SIGNED AND
SEALED
APR 28 1970

(SEAL)
Attest:

Edward M. Fletcher, Jr.
Attesting Officer

WILLIAM E. SCHUYLER, JR.
Commissioner of Patents